United States Patent
Yoshimura

(10) Patent No.: US 11,250,581 B2
(45) Date of Patent: Feb. 15, 2022

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Kazuhiro Yoshimura, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 47 days.

(21) Appl. No.: 16/359,736

(22) Filed: Mar. 20, 2019

(65) Prior Publication Data
US 2019/0304114 A1  Oct. 3, 2019

(30) Foreign Application Priority Data
Apr. 3, 2018 (JP) .............................. JP2018-071723

(51) Int. Cl.
G06T 7/564 (2017.01)
G06T 7/557 (2017.01)
G06T 7/194 (2017.01)
G06T 7/174 (2017.01)
G06T 7/11 (2017.01)

(52) U.S. Cl.
CPC ............... *G06T 7/564* (2017.01); *G06T 7/11* (2017.01); *G06T 7/174* (2017.01); *G06T 7/194* (2017.01); *G06T 7/557* (2017.01); *G06T 2207/20224* (2013.01)

(58) Field of Classification Search
CPC ......... G06T 7/564; G06T 7/557; G06T 7/194; G06T 7/174; G06T 7/11; G06T 2207/20224
See application file for complete search history.

(56) References Cited

U.S. PATENT DOCUMENTS

2006/0232583 A1* 10/2006 Petrov ...................... G06K 9/20
345/419

FOREIGN PATENT DOCUMENTS

JP  10-21408 A  1/1998

* cited by examiner

*Primary Examiner* — Ruiping Li
(74) *Attorney, Agent, or Firm* — Canon U.S.A., Inc. IP Division

(57) ABSTRACT

A region of an object is separated from an image captured by an image capturing unit included in a plurality of image capturing units configured to capture an image of an object from a plurality of viewpoints, using a method corresponding to light applied to an image-capturing target region of the image capturing unit at a time of capturing the image. Then, the shape of the object is determined based on the region of the object separated by a separation unit from each of a plurality of images captured by the plurality of image capturing units.

12 Claims, 13 Drawing Sheets

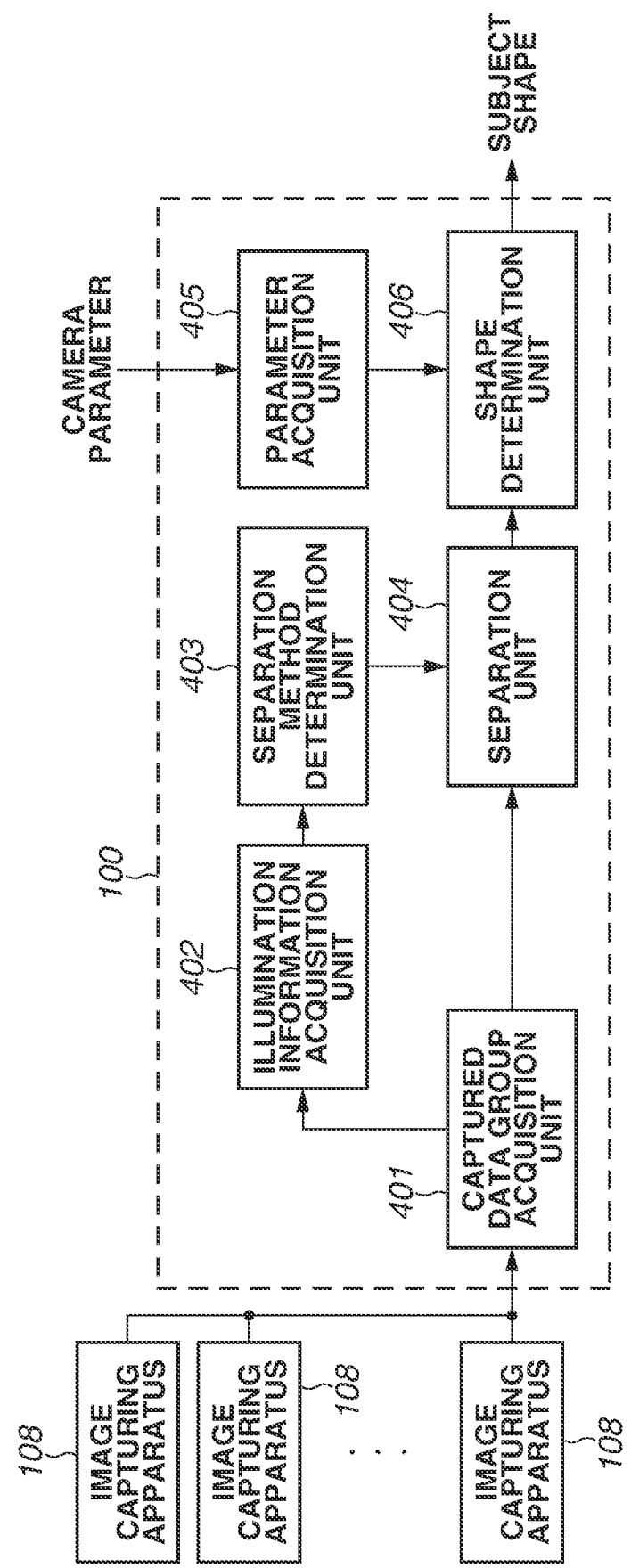

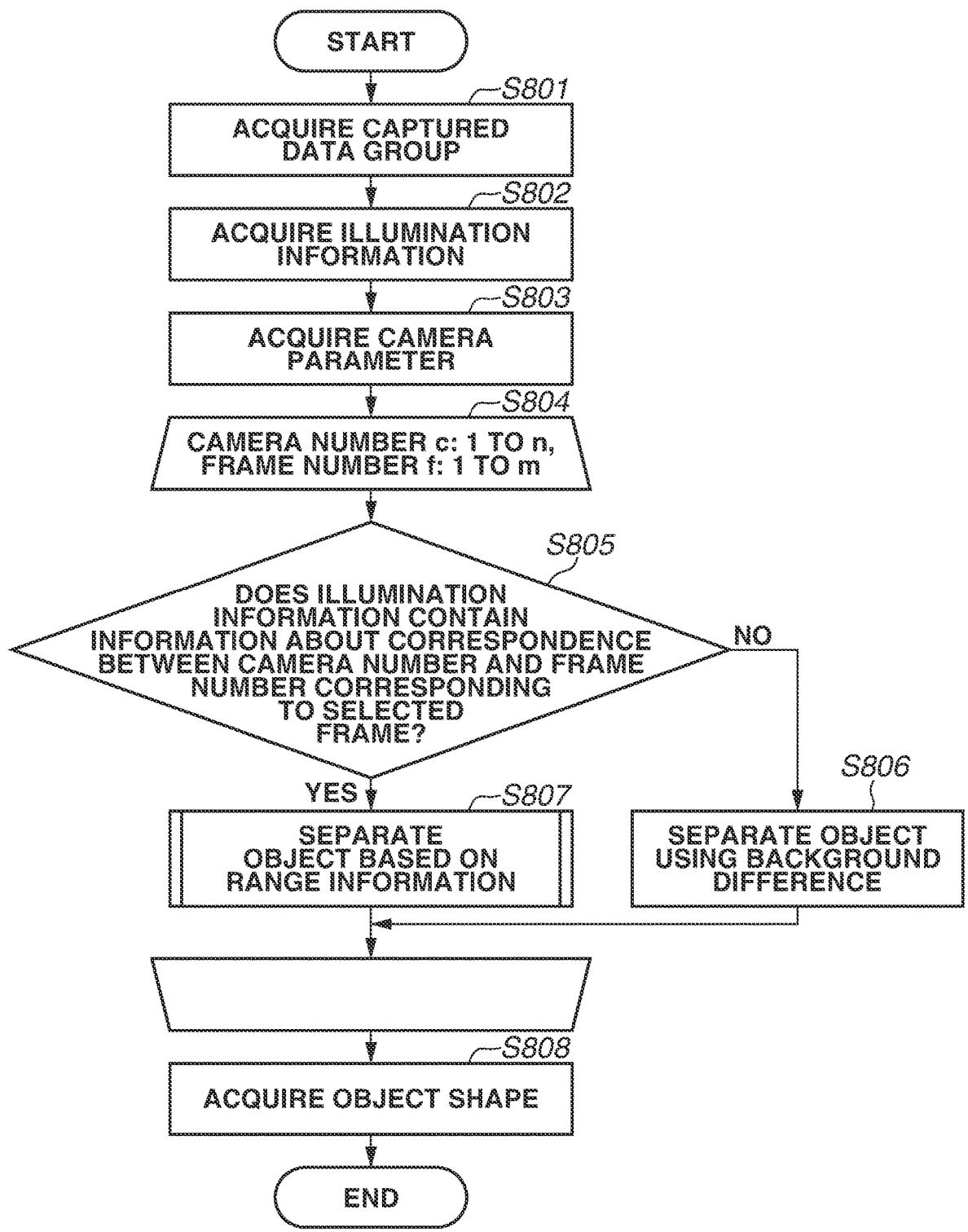

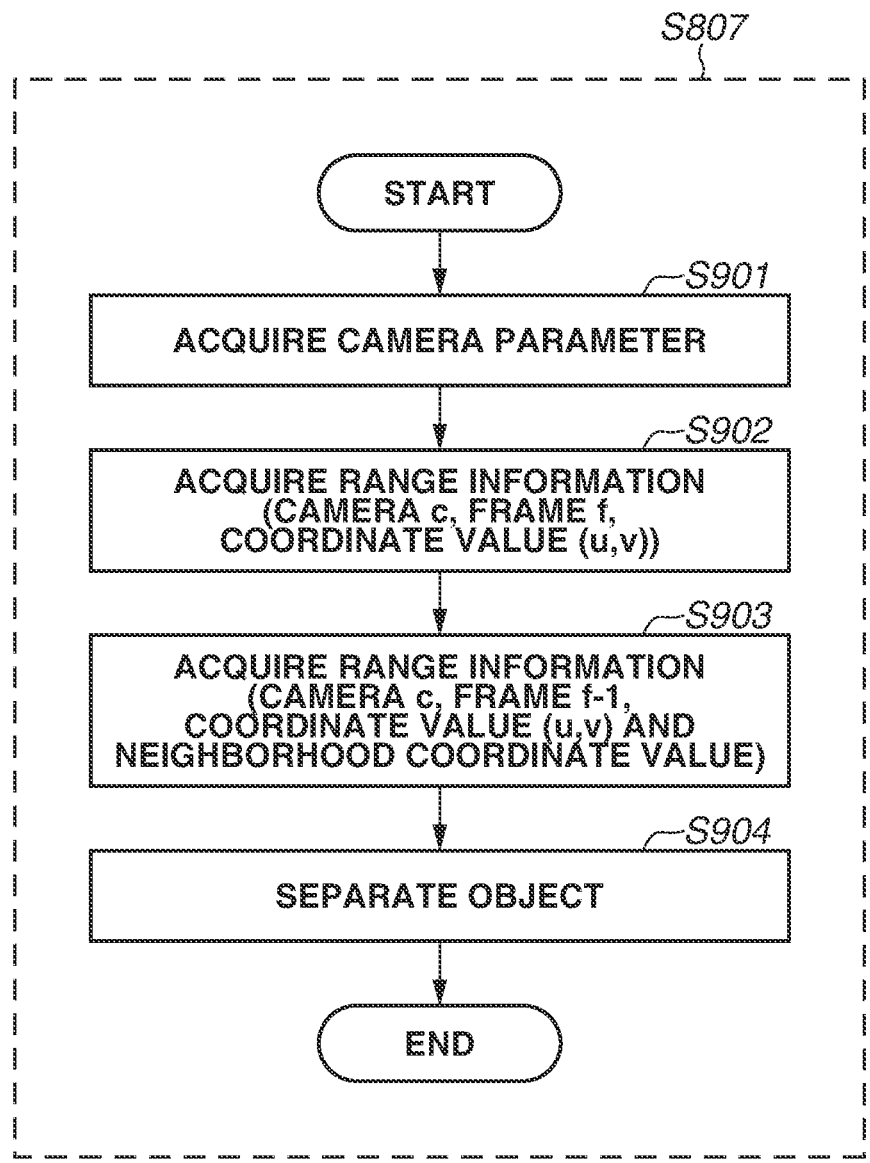

FIG.13

| CAMERA NUMBER | FRAME NUMBER | PIXEL | | ILLUMINATION 1002 | ILLUMINATION 1003 | ILLUMINATION 1004 – |
|---|---|---|---|---|---|---|
| | | u | v | | | |
| 1 | 1 | 1 | 1 | × | BLUE | ... |
| | | 1 | 2 | × | BLUE | ... |
| | | ⋮ | ⋮ | | | |
| | 2 | 1 | 1 | YELLOW | × | |
| | | 1 | 2 | YELLOW | × | |
| | | ⋮ | ⋮ | | | |
| | ⋮ | ⋮ | ⋮ | | | |
| 2 | 1 | 1 | 1 | YELLOW | RED | |
| | | ⋮ | ⋮ | | | |
| | 2 | 1 | 1 | YELLOW | RED | |
| | | ⋮ | ⋮ | | | |
| 3 | 1 | 1 | 1 | | | |
| ⋮ | ⋮ | ⋮ | ⋮ | | | |

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus, an information processing method, and a storage medium.

Description of the Related Art

There are conventionally-known methods for extracting an object contained in an image, such as a background difference method in which an object is extracted by determining the difference between an image containing the object and a background image of a background not containing the object. Such a method is used in, for example, acquiring the shape of an object from a multi-viewpoint object region using a visual hull method. In object extraction using a method such as the background difference method, pixels that are different in color and/or luminance value from those in a background image are extracted as pixels containing an object. The object is extractable with high accuracy if light applied to an entire scene including the object and background is uniform. However, in a case in which a change in an illumination environment, etc. leads to a successive change in color of the object as well as the background, the object extraction accuracy may decrease. To deal with such an issue, Japanese Patent Application Laid-Open No. 10-21408 discusses a technique that realizes object extraction that can deal with a case of a time-series change in pixel values by updating a threshold value in the object extraction based on the amount of change in an image.

An object region is separated from each of a plurality of images captured respectively by a plurality of image capturing units configured to image an object from different viewpoints, and the shape of the object is determined using the object regions separated from the plurality of images. In an image capturing region of the image capturing units, the lighting of a flash, a sudden change in illumination applied by an illumination device, etc. can cause a sudden change in the light applied to the image capturing region of the image capturing units. In this case, it is difficult to separate the object from the images captured by the image capturing units with high accuracy by the technique discussed in Japanese Patent Application Laid-Open No. 10-21408. This makes it difficult to determine the object shape with high accuracy.

SUMMARY OF THE INVENTION

The present disclosure is directed to an information processing apparatus capable of determining the shape of an object with higher accuracy even in a case in which light applied to the object changes.

According to an aspect of the present disclosure, an information processing apparatus includes a separation unit configured to separate, from an image captured by an image capturing unit included in a plurality of image capturing units configured to capture an image of an object from a plurality of viewpoints, a region of the object using a method for light applied to an image-capturing target region of the image capturing unit at a time of capturing the image, and a determination unit configured to determine a shape of the object based on the region of the object separated by the separation unit from each of a plurality of images captured by the plurality of image capturing units.

Further features of the present disclosure will become apparent from the following description of exemplary embodiments with reference to the attached drawings.

BRIEF DESCRIPTION OF THE DRAWINGS

FIG. 4 is a block diagram illustrating an example of a functional configuration of the information processing apparatus.

FIG. 7 is a flowchart illustrating an example of a process performed by the information processing apparatus.

FIG. 8 is a flowchart illustrating an example of a process performed by the information processing apparatus.

FIG. 13 is an example of a table illustrating correspondence between the emission state of an illumination device and pixels of the image capturing apparatuses.

DESCRIPTION OF THE EMBODIMENTS

Various exemplary embodiments of the present disclosure will be described in detail below with reference to the drawings.

Figure 1:
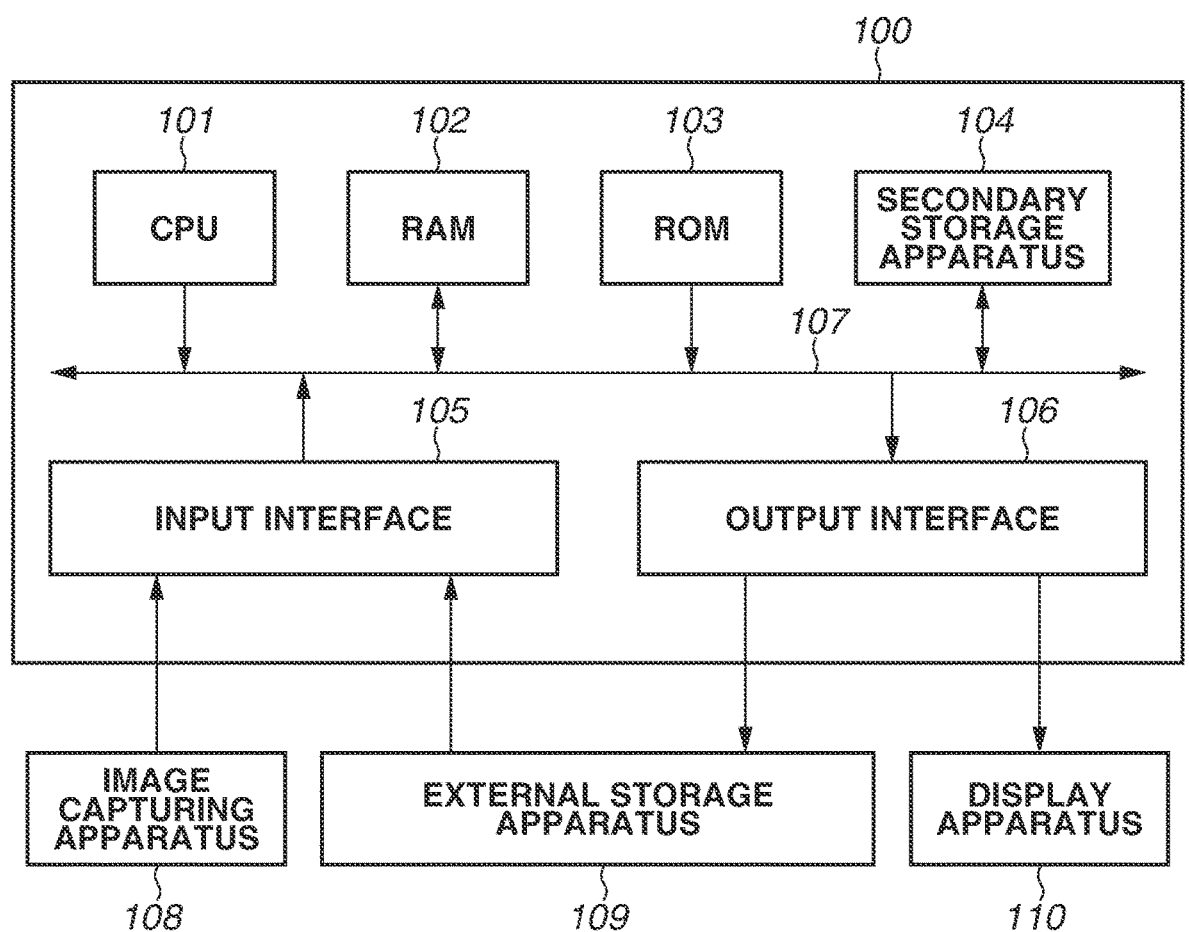
FIG. 1 is a block diagram illustrating an example of a hardware configuration of an information processing apparatus.

FIG. 1 is a block diagram illustrating an example of a hardware configuration of an information processing apparatus 100 according to a first exemplary embodiment. The information processing apparatus 100 is connected to a plurality of image capturing apparatuses 108 having a different viewpoint from one another, separates an object region from the images acquired from the image capturing apparatuses 108, and determines an object shape based on the separated object region. The information processing apparatus 100 is, for example, a personal computer, a server apparatus, a tablet apparatus, a smartphone, a computer built in a device. Further, the information processing apparatus 100 can be an image capturing apparatus such as a network camera.

The information processing apparatus 100 includes a central processing unit (CPU) 101, a random-access memory (RAM) 102, a read-only memory (ROM) 103, a secondary storage apparatus 104, an input interface 105, and an output interface 106, all of which are communicably connected with one another via a system bus 107.

The CPU 101 is a central processing unit configured to control the information processing apparatus 100. The RAM 102 is a storage apparatus configured to function as a work area of the CPU 101 and a temporary data storage location. The ROM 103 is a storage apparatus configured to store programs and the like for controlling the respective components of the information processing apparatus 100. The CPU 101 executes a program stored in the ROM 103 using the RAM 102 as the work area and comprehensively controls the respective components of the information processing apparatus 100 via the system bus 107.

The secondary storage apparatus 104 is a storage apparatus, such as a hard disk drive (HDD), solid state drive (SSD), flash memory, or optical disk drive, configured to store various programs, various setting information, images acquired from the image capturing apparatuses 108. The CPU 101 is capable of writing data to the secondary storage apparatus 104 and reading data stored in the secondary storage apparatus 104 via the system bus 107.

The input interface 105 is, for example, a universal serial bus (USB) interface or an Institute of Electrical and Electronics Engineers (IEEE) 1394 serial bus interface and is used to input data, instructions, and the like from an external apparatus to the information processing apparatus 100. The information processing apparatus 100 is connected to each of the plurality of image capturing apparatuses 108, an external storage apparatus 109 via the input interface 105. The CPU 101 acquires various data (e.g., images including still images and moving images captured by the image capturing apparatuses 108, data such as parameters relating to image capturing conditions of the image capturing apparatuses 108) from the image capturing apparatuses 108 via the input interface 105. Further, the CPU 101 acquires data from the external storage apparatus 109 (e.g., a storage medium such as a hard disk, memory card, compact flash (CF) card, secure digital (SD) card, or USB memory) via the input interface 105.

The output interface 106 is a serial bus interface, such as a USB interface or an IEEE 1394 serial bus interface, similar to the input interface 105 and is used to output information to an external apparatus. Further, the output interface 106 can be, for example, a video image output terminal such as a digital visual interface (DVI) and a high-definition multimedia interface (HDMI®). The information processing apparatus 100 is connected to the external storage apparatus 109 and a display apparatus 110 via the output interface 106. The CPU 101 outputs a processed image to the display apparatus 110 (any type of image display device such as a liquid crystal display) via the output interface 106 to display the image.

The CPU 101 executes processing based on a program stored in the ROM 103 or the secondary storage apparatus 104 to realize the functions of the information processing apparatus 100 described below with reference to FIGS. 4 and 11, the processes illustrated in the flowcharts in FIGS. 5, 7, 8, and 12.

Figure 2A:
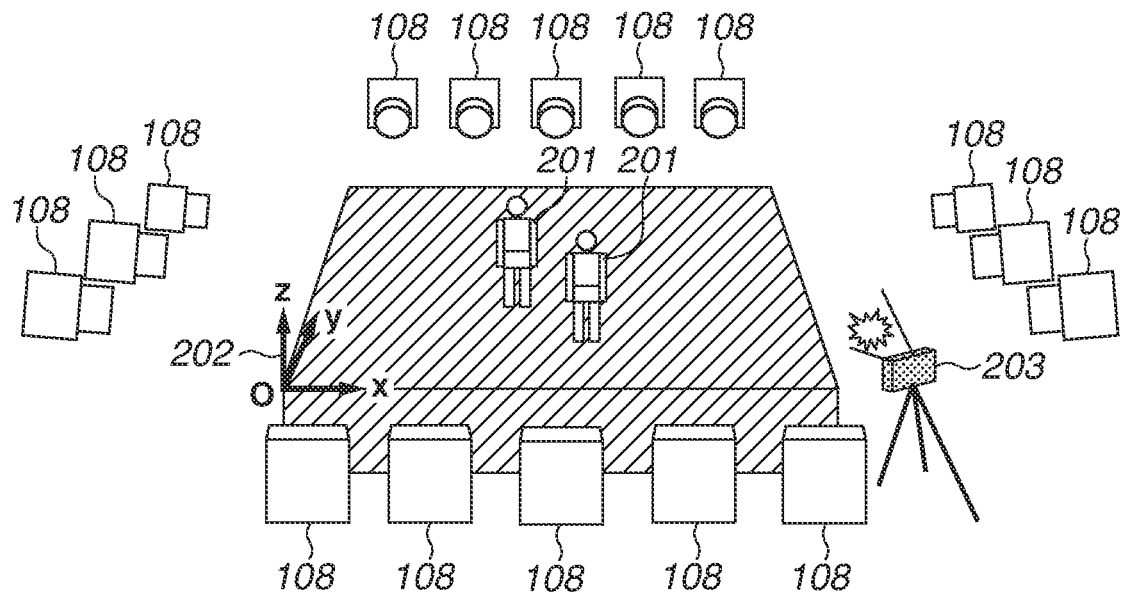
FIG. 2A is a diagram illustrating an example of a layout of image capturing apparatuses in a case of viewing an image-capturing target object region from an obliquely-upward direction.

FIG. 2A illustrates an example of a layout of the plurality of image capturing apparatuses 108 when a region of image-capturing target objects is viewed from an obliquely-upward direction. Each of the image capturing apparatuses 108 is, for example, an image capturing apparatus (image capturing unit) such as a network camera or a monitoring camera. Each of the plurality of image capturing apparatuses 108 is arranged in such a way as to capture an image of a predetermined region from a different viewpoint from the others. In the example illustrated in FIG. 2A, this region is a stage where objects 201, which are two persons, are present.

Figure 2B:
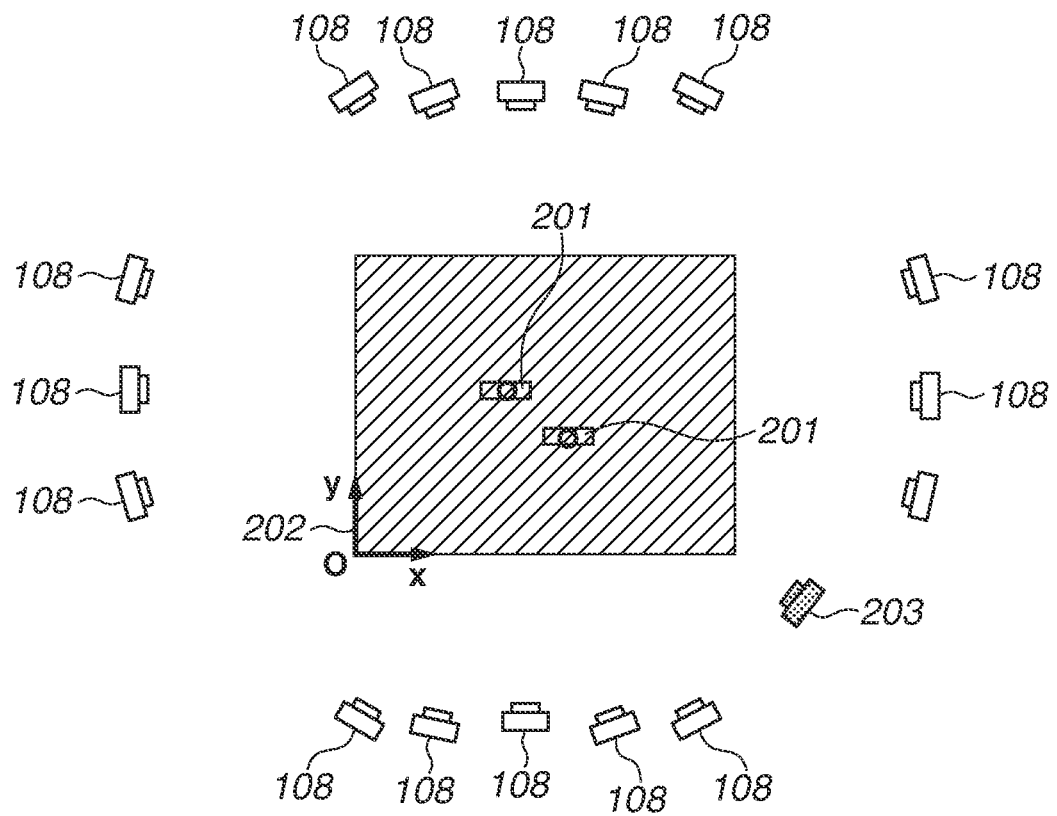
FIG. 2B is a diagram illustrating an example of the layout of the image capturing apparatuses in a case of viewing the image-capturing target object region from directly above.

FIG. 2B illustrates an example of a layout of the plurality of image capturing apparatuses 108 when the region of image-capturing target objects is viewed from directly above. In FIGS. 2A and 2B, the plurality of image capturing apparatuses 108 is arranged in such a way as to surround the stage and captures images of the objects 201. The objects 201 are acting, singing, moving, or the like on the stage, and images of the objects 201 acting, singing, moving, or the like are captured by the image capturing apparatuses 108.

A coordinate system 202 in FIGS. 2A and 2B is a coordinate system that is determined in the region and used to specify the positions of the image capturing apparatuses 108, and the like. For example, the positions of the image capturing apparatuses 108 are specified as coordinate values in the coordinate system 202. A camera 203 has a flash function and captures an image of the objects 201 moving in a system independent of the information processing apparatus 100, from a single viewpoint.

Now, a possible problem, which can occur in a state illustrated in FIGS. 2A and 2B, will be described. The camera 203 turns on flash at a time of image capturing in order to capture a clearer object image. While the scene in which persons as the objects are moving on the stage is described as an example in FIGS. 2A and 2B, the processing according to the present exemplary embodiment is also applicable to other scenes such as a scene in which the image capturing apparatuses 108 are arranged in such a way as to surround an object other than a person and reconstructs the shape of the object.

Figure 3A:
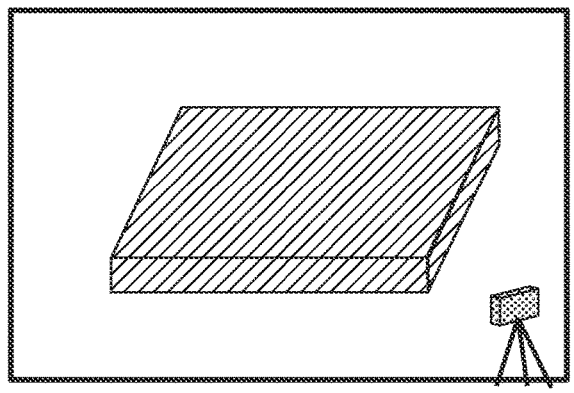
FIG. 3A is a diagram illustrating an example of a background image of the image-capturing target object region captured by an image capturing apparatus.

The image in FIG. 3A is a background image of an image-capturing target region that is captured by one of the image capturing apparatuses 108. As used herein, the background image refers to an image of the image-capturing target region of the image capturing apparatuses 108 in which there is no object.

Figure 3D:
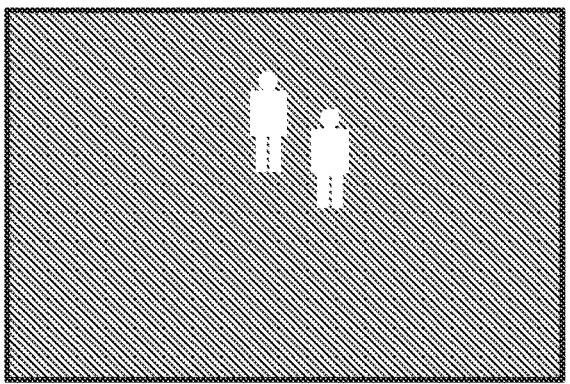
FIG. 3D is a diagram illustrating an example of an image indicating a result of a background difference method performed on the image illustrated in FIG. 3B using the background image illustrated in FIG. 3A.
Figure 3B:
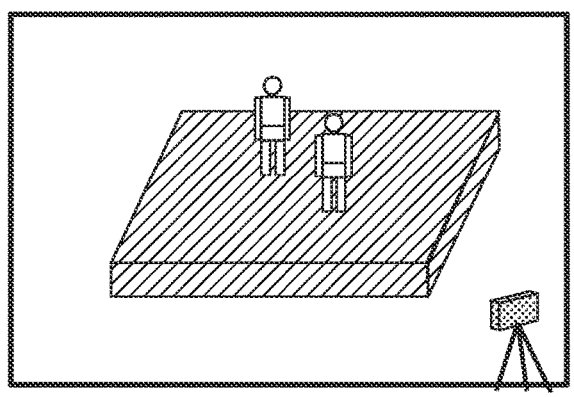
FIG. 3B is a diagram illustrating an example of an image that contains target objects and is captured by an image capturing apparatus without involving flash by a camera.
Figure 3E:
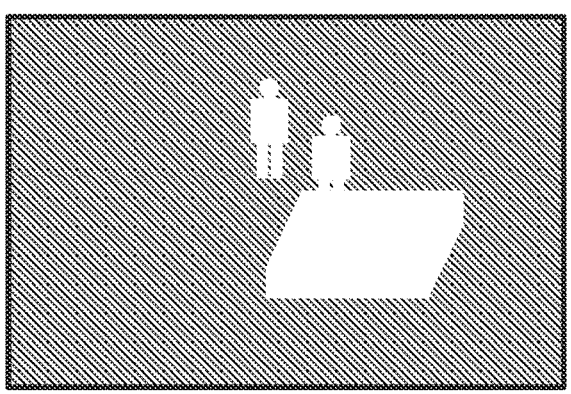
FIG. 3E is a diagram illustrating an example of an image illustrating a result of the background difference method performed on the image illustrated in FIG. 3C using the background image illustrated in FIG. 3A.
Figure 3C:
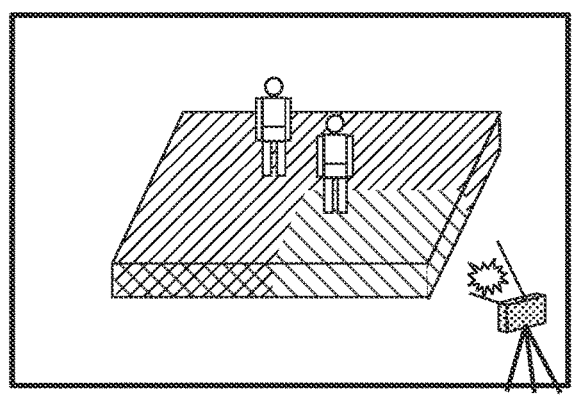
FIG. 3C is a diagram illustrating an example of an image that contains the objects and is captured by an image capturing apparatus involving flash by the camera.

The images in FIGS. 3B and 3C are images that are captured by the same image capturing apparatus 108 and contain the objects 201. At a time at which the image in FIG. 3B is captured, the camera 203 has not performed image-capturing and the flash of the camera 203 has not yet turned on. At a time at which the image in FIG. 3C is captured, the camera 203 performs flash image-capturing, and the objects 201 and part of the stage are illuminated by the flash of the camera 203 and thus appear brighter.

The images in FIGS. 3D and 3E are respectively images indicating results of background difference processing on the images illustrated in FIGS. 3B and 3C using the background image illustrated in FIG. 3A. From the image in FIG. 3D, it is understood that only the objects 201 are separated by the background difference method. However, from the image in FIG. 3E, it is understood that the part of the stage is also extracted besides the objects 201 due to the effect of the flash light of the camera 203.

In a case where a result of multi-viewpoint background difference processing in which the objects 201 are separated without an effect of the flash as in the image in FIG. 3D is used as input data in the determination of the shapes of the objects 201 using a method such as a visual hull method, the shapes of the objects 201 are determined with high accuracy. However, in a case where a result of background difference processing in which a portion other than the objects 201 is also separated due to an effect of the flash as in the image in FIG. 3E is used as input data, it is difficult to determine the shapes of the objects 201 with high accuracy. For example, the shape of the part of the object 201 below the knees is separated as an inaccurate shape (i.e., a single aggregate shape), so that it is difficult to acquire the accurate shapes of the legs.

Figure 5:
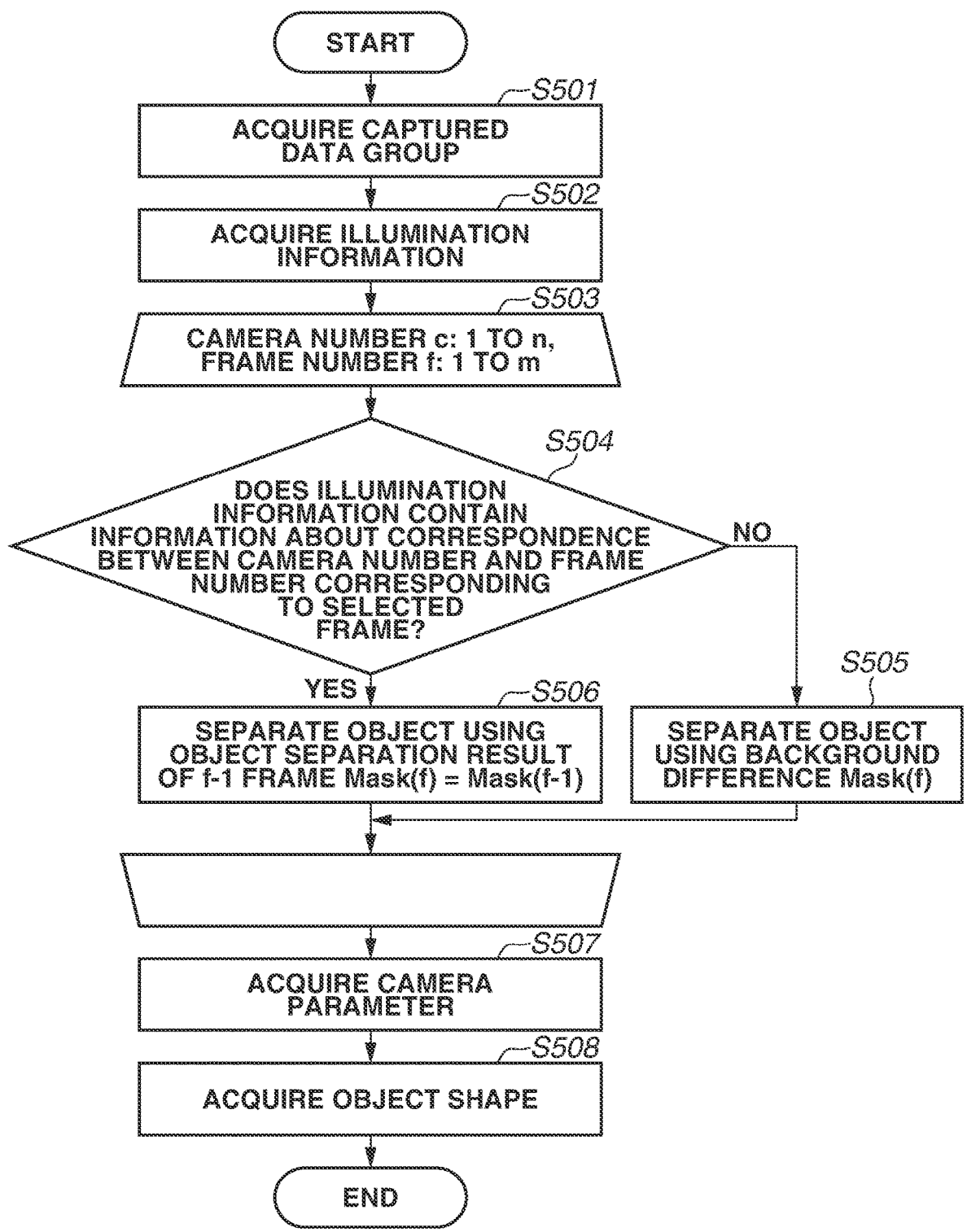
FIG. 5 is a flowchart illustrating an example of a process performed by the information processing apparatus.

The processing of the information processing apparatus 100 according to the present exemplary embodiment will be described with reference to FIGS. 4 and 5.

FIG. 4 is a block diagram illustrating an example of a functional configuration of the information processing apparatus 100. The information processing apparatus 100 includes a captured data group acquisition unit 401, an illumination information acquisition unit 402, a separation method determination unit 403, a separation unit 404, a parameter acquisition unit 405, and a shape determination unit 406.

The captured data group acquisition unit 401 acquires, from the respective image capturing apparatuses 108, data on images captured respectively by the image capturing apparatuses 108.

The illumination information acquisition unit 402 acquires illumination information based on the images acquired by the captured data group acquisition unit 401. The illumination information indicates details of how light is applied to the image-capturing target region of the image capturing apparatuses 108.

The separation method determination unit 403 determines, based on the illumination information acquired by the illumination information acquisition unit 402, a method for use in separating objects from the image captured by each of the image capturing apparatuses 108.

The separation unit 404 separates an object region from the image captured by each of the image capturing apparatuses 108 using the method determined by the separation method determination unit 403.

The parameter acquisition unit 405 acquires, from each of the image capturing apparatuses 108 via the input interface 105, camera parameters, such as an internal parameter, external parameter, and distortion parameter, of each of the image capturing apparatuses 108. The internal parameter refers to a parameter such as a coordinate value of an image center and a focal length of a camera lens. The external parameter refers to a parameter that indicates the position and orientation of the camera. The distortion parameter refers to a parameter that indicates a lens distortion of the camera. The camera parameters may be estimated by structure-from-motion based on multi-viewpoint image data or may be calculated in advance by calibration using a chart. Further, the parameter acquisition unit 405 may acquire the camera parameters such as the internal parameter, external parameter, and distortion parameter of each of the image capturing apparatuses 108 from the secondary storage apparatus 104.

The shape determination unit 406 determines an object shape based on the camera parameters of the respective image capturing apparatuses 108 acquired by the parameter acquisition unit 405 and the object region separated by the separation unit 404.

A process performed by the functional units of the information processing apparatus 100 will be described with reference to FIG. 5. FIG. 5 is a flowchart illustrating an example of processing performed by the information processing apparatus 100.

In step S501, the captured data group acquisition unit 401 acquires, via the input interface 105, temporally-consecutive multi-viewpoint image data groups captured by the plurality of image capturing apparatuses 108. In the present exemplary embodiment, there are sixteen image capturing apparatuses 108. The image capturing apparatuses 108 each capture a 10-second moving image (600 frames (still images)) of 60 fps at synchronized timings. Accordingly, the captured data group acquisition unit 401 acquires image data on 600-by-16 images. The captured data group acquisition unit 401 outputs the acquired image data to the illumination information acquisition unit 402 and the separation unit 404.

In step S502, the illumination information acquisition unit 402 acquires illumination information, which is information about light applied to the image-capturing target regions of the image capturing apparatuses 108 at the time of capturing the frames, based on the image data acquired from the captured data group acquisition unit 401. In the present exemplary embodiment, the illumination information is assumed to be information indicating, for each of the plurality of image capturing apparatuses 108, whether the light applied to the image-capturing target regions of the plurality of image capturing apparatuses 108 at the time of capturing the frames contains momentarily-applied light such as a camera flash. A camera flash is an example of short-term light. The short-term light refers to light applied only for a period not longer than a predetermined threshold time period, such as a camera flash, spark light, or thunder light. In the present exemplary embodiment, the image-capturing target regions of the image capturing apparatuses 108 may be illuminated by a camera flash.

The illumination information acquisition unit 402 identifies, for each of the image capturing apparatuses 108, the frame that the image-capturing target region is illuminated by the camera flash during the image capturing, among the frames captured by each of the image capturing apparatuses 108. Then, the illumination information acquisition unit 402 acquires information about the identified frame (information that specifies the image capturing apparatus 108 that captures the frame (e.g., identification information such as an identifier of the image capturing apparatus 108) and frame identification information (e.g., frame number)) as the illumination information. In the present exemplary embodiment, the illumination information acquisition unit 402 identifies a frame that satisfies the following formulas (1) to (3) as a frame affected by the flash.

$$I(f, u, v) - I(f - 1, u, v) \geq \alpha \quad (1)$$

$$I(f' - 1, u, v) - I(f', u, v) \geq \alpha \quad (2)$$

$$\left.\begin{array}{l} f' - f \geq \beta \\ f' - f \leq \chi \end{array}\right\} \quad (3)$$

In formulas (1) and (2), I(f, u, v) is the luminance value of the pixel at the coordinate (u, v) of the image of the frame f. In formulas (1), (2), and (3), f and f' each indicate a frame number. The frame number is the number of the frame in frames in sequential order. In formulas (1) and (2), u and v are coordinate values in the image. In formulas (1), (2), and (3), $\alpha$, $\beta$, and $\chi$ are predetermined threshold values.

A frame to be an inspection target of whether the frame is affected by the flash is specified as "frame f'". Formula (1) is a formula used to detect whether the difference in the luminance value at the coordinate (u, v) between a frame f−1 (previous frame captured immediately before the frame f) and the frame f captured by the same image capturing apparatus 108 is greater than or equal to a threshold value $\alpha$. The illumination information acquisition unit 402 compares the frames f and f−1 using formula (1) to thereby determine whether there is a steep rise in luminance at the time point at which the frame f is captured, with respect to the frame f−1.

A frame f' is a frame that is captured by the same image capturing apparatus 108 after the frame f. Formula (2) is a formula used to detect whether the difference in the luminance value at the coordinate (u, v) between a frame f'−1 (previous frame captured immediately before the frame f') and the frame f' captured by the same image capturing apparatus 108 is greater than or equal to a threshold value $\alpha$. The illumination information acquisition unit 402 compares the frames f' and f'−1 using formula (2) to thereby determine whether there is a steep rise in luminance at the time point at which the frame f' is captured, with respect to the frame f'−1.

If the illumination information acquisition unit 402 determines that, for example, the frame f satisfies formula (1), the illumination information acquisition unit 402 initializes the frame f' as a frame f+1. Then, the illumination information acquisition unit 402 determines whether the frame f' satisfies formula (2), and if the illumination information acquisition unit 402 determines that the frame f' does not satisfy formula (2), the illumination information acquisition unit 402 updates the frame f' by incrementing the frame number of the frame f' by one. Specifically, in a case in which the frame f' is the frame f+1, the frame f' is updated to a frame f+2.

Then, the illumination information acquisition unit 402 re-determines whether the frame f' satisfies formula (2). The illumination information acquisition unit 402 repeats the foregoing processing until the frame f' that satisfies formula (2) is found, thereby detecting the frame f' that satisfies formula (2).

If the illumination information acquisition unit 402 detects the frame f' that satisfies formula (2), the illumination information acquisition unit 402 determines whether the frames f and f' satisfy formula (3) (i.e., whether the frame interval between the frames f and f' is not less than $\beta$ (e.g., 1, 2) and not more than $\chi$ (e.g., 5, 6)). Then, if the illumination information acquisition unit 402 determines that the frames f and f' satisfy formula (3), the illumination information acquisition unit 402 identifies the frames f, f+1, . . . , and f'−1 as the frames affected by the flash.

The case in which formulas (1) to (3) are satisfied is a case in which the image-capturing target region is illuminated by light having an intensity not less than a predetermined intensity applied for a period not longer than the predetermined threshold period (e.g., period not longer than the period corresponding to the $\chi$-frame interval). The illumination information acquisition unit 402 can identify such frames affected by the light by detecting the frames f and f' that satisfy formulas (1) to (3).

Then, the illumination information acquisition unit 402 associates information indicating the image capturing apparatuses 108 corresponding to the frame identified as a frame affected by the flash and frame number information about the frame, and outputs the illumination information to the separation method determination unit 403 as the illumination information.

In the present exemplary embodiment, the illumination information acquisition unit 402 performs the above-described processing to thereby identify the frames affected by the flash, acquire the illumination information, and output the illumination information. Alternatively, the illumination information acquisition unit 402 may, for example, perform foreground background separation on all combinations of frames of adjacent frame numbers using the background difference method and identify a frame with a steep increase in foreground region size as a frame in which a change in luminance occurs due to the effect of the flash.

In step S503, the separation method determination unit 403 performs control so that all frames captured by the plurality of image capturing apparatuses 108 (all frames acquired in step S501) are subjected to the processing of steps S504 to S506. More specifically, the separation method determination unit 403 selects, from all the frames acquired in step S501, one frame to be a target of the processing of steps S504 to S506. Hereinafter, the frame that is selected will be referred to as "selected frame".

Then, if the processing of steps S504 to S506 on the selected frame is completed, the separation method determination unit 403 selects a frame that has not been selected, as a new selected frame from all the frames acquired in step S501. The separation method determination unit 403 repeats the above-described processing until the processing of steps S504 to S506 on all the frames acquired in step S501 is completed.

In step S504, the separation method determination unit 403 determines a method for separating an object region from each frame acquired by the image capturing apparatuses 108, based on the illumination information acquired in step S502. In the present exemplary embodiment, the illumination information includes the number of the image capturing apparatus that captures an image of the object illuminated by the flash, and the frame number of the captured frame. Thus, the separation method determination unit 403 determines whether the illumination information contains information about the correspondence between the number of the image capturing apparatus 108 corresponding to the selected frame and the frame number corresponding to the selected frame.

If the separation method determination unit 403 determines that the illumination information contains information about the correspondence between the number of the image capturing apparatus 108 corresponding to the selected frame and the frame number corresponding to the selected frame (YES in step S504), the separation method determination unit 403 determines the method of step S506 as the object separation method for the selected frame, and the processing proceeds to step S506. On the other hand, if the separation method determination unit 403 determines that the illumination information does not contain information about the correspondence between the number of the image capturing apparatus 108 corresponding to the selected frame and the frame number corresponding to the selected frame (NO in step S504), the separation method determination unit 403 determines the method of step S505 as an object separation method for the selected frame, and the processing proceeds to step S505.

In step S505, the separation unit 404 performs object region separation processing on the selected frame that is not affected by the flash. In the present exemplary embodiment, the separation unit 404 uses the background difference method to separate an object region from the frame that is not affected by the flash. The background difference method is a method in which a background image not containing an object is compared with an image containing the object and a foreground object is extracted based on a difference in color and/or luminance. With this processing, the background object and the object region can be separated. In the present exemplary embodiment, the separation unit 404 uses, as input data, the plurality of temporally-consecutive images captured by the same image capturing apparatus 108 and acquired in step S501, and identifies pixel values for each image of the plurality of images, and calculates an intermediate value of the identified pixel values for each pixel. Then, the separation unit 404 generates, as a background image, an image in which the pixel value of each pixel corresponds to the calculated intermediate value.

Then, the separation unit 404 compares the pixel value of each pixel in the generated background image with the pixel value of the corresponding pixel in the selected frame, and if the difference between the pixel values is not less than a threshold value, the separation unit 404 separates the object in the pixel as an object region. In the present exemplary embodiment, the separation unit 404 generates the background image to be used for the images captured by the image capturing apparatuses 108 based on the images captured by the image capturing apparatuses 108. Alternatively, the separation unit 404 may generate a background image by capturing an image of the image-capturing target region without an object in advance using the image capturing apparatuses 108.

The separation unit 404 outputs information about the separated object region to the shape determination unit 406. The object region information is, for example, a binary image (silhouette data) in which a region with an object in the image is expressed white and a background region with no object is expressed black.

In step S506, the separation unit 404 performs object region separation processing on the selected frame affected by the flash. In the present exemplary embodiment, as a result of the object region separation processing on the selected frame affected by the flash, the separation unit 404 directly uses the result of the object region separation processing performed on the frame of one frame before the selected frame captured by the same image capturing apparatuses 108 as the selected frame. There can be a case in which the frame of one frame before the selected frame is affected by the flash. However, the result of the object region separation performed on the frame of one frame before the frame of one frame before the selected frame is applied to the result of the object region separation performed on the frame of one frame before the selected frame. As described above, the separation unit 404 can use the result of the object separation processing of the object region in the frame that is not affected by the flash, as result of the object separation processing of the object region in the frame that is affected by the flash.

In a case in which an image is captured by a camera with a resolution of 4096-by-2160 and a frame rate of 60 fps so that the vertical size of a person as an object in the image is ⅛, since the moving speed of a person is about 4 km/h, the object is moved by about 2.8 pixels between the frames. The object is separated at the position shifted by 2.8 pixels from the actual object position, but the shift of 2.8 pixels can be considered as a small shift in the image of a resolution of 4096-by-2160. Thus, the small shift of the object position between the adjacent frames can be ignored in the case in which the object is separated from the temporally-consecutive frames (60 fps) and the shape of the object is determined as in the present exemplary embodiment. The separation unit 404 outputs the result of the object region separation to the shape determination unit 406.

In the present exemplary embodiment, the separation unit 404 separates the object region from the frame affected by the flash in step S506 using the above-described method. Alternatively, the separation unit 404 may apply, as the result of the object region separation on the frame affected by the flash, for example, a result of object region separation performed on a frame that is not the frame of one frame before the frame affected by the flash and is captured at a time point different from the time point at which the frame affected by the flash is captured. For example, the separation unit 404 may apply, as the result of the object region separation performed on the frame affected by the flash, a result of object region separation performed on a frame that is not affected by the flash and is captured after the frame affected by the flash is captured. For example, in a case in which two consecutive frames are affected by the flash, the separation unit 404 may perform operation as follows. Specifically, the separation unit 404 may apply the result of the object region separation performed on the frame of one frame before the target frame for the first frame, and apply the result of the object region separation performed on the frame of one frame after the target frame for the second frame.

Further, the separation unit 404 may generate a result of object region separation on the frame affected by the flash based on results of object region separation on a plurality of frames captured at a time point different from the time point at which the frame affected by the flash is captured. For example, in a case in which one frame is affected by the flash, the separation unit 404 calculates an average of the result of the object region separation on the frame of one frame before the target frame and the result of the object region separation on the frame of one frame after the target frame. Then, the separation unit 404 may determine the calculated average separation result as a result of object region separation on the target frame affected by the flash.

In step S507, the parameter acquisition unit 405 acquires the camera parameters of the respective image capturing apparatuses 108 therefrom via the input interface 105 or from the secondary storage apparatus 104. The parameter acquisition unit 405 outputs the acquired camera parameters to the shape determination unit 406.

In step S508, the shape determination unit 406 determines the shape of the object based on the object region information input from the separation unit 404 in step S505 or S506 and the camera parameters input from the parameter acquisition unit 405 in step S507. In the present exemplary embodiment, the shape determination unit 406 determines the object shape using the visual hull method. In the shape determination using the visual hull method, sampling points in a space where the object may possibly exist are projected onto the object region separation result (silhouette data), and the object shape is reconstructed by inspecting whether the sampling points are commonly included in the silhouette across a plurality of viewpoints. In the visual hull method, highly-accurate shape reconstruction is possible by reducing the sampling width in the space. The shape determination unit 406 outputs information about the determined object shape by, for example, displaying the information on the display apparatus 110. Further, the shape determination unit 406 may output the information about the determined object shape by storing the information in the secondary storage apparatus 104. Further, the shape determination unit 406 may output the information about the determined object shape by transmitting the information to a predetermined transmission destination such as an external information processing apparatus.

In the present exemplary embodiment, the process is described in which the information processing apparatus 100 determines an object shape with higher accuracy in the case in which the image-capturing target region of the image capturing apparatuses 108 is illuminated by the camera flash. The information processing apparatus 100 is also capable of determining an object shape with high accuracy using a similar process even in a case in which the image-capturing target region of the image capturing apparatuses 108 is illuminated by short-term light (e.g., light of thunder, and spark) different from the camera flash.

As described above, in the present exemplary embodiment, the information processing apparatus 100 separates an object region from the images captured by the plurality of image capturing apparatuses 108 using a method suitable for the light applied to the image-capturing target region when the images are captured. Then, the information processing apparatus 100 determines the object shape based on the separated object region. In this way, the information processing apparatus 100 can determine the object shape with high accuracy even in the case in which the light applied to the object imaged by the image capturing apparatuses 108 is changed suddenly.

Figure 6A:
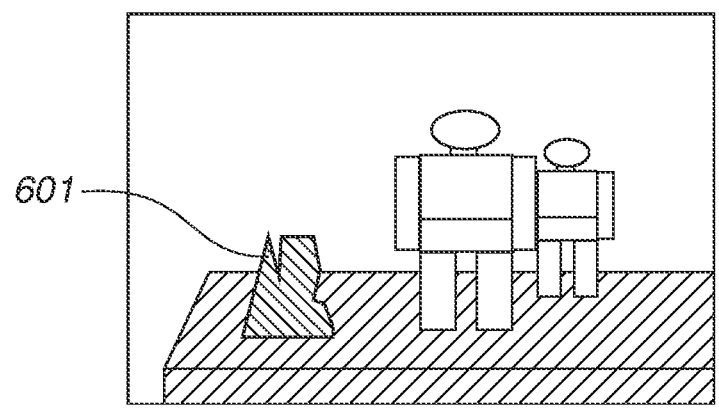
FIG. 6A is a diagram illustrating an example of an image of an object shape determined based on the image illustrated in FIG. 3E, which is viewed from a virtual viewpoint.

As described above with reference to FIGS. 3A to 3E, if the background difference method is used to separate an object from a frame affected by the flash, a region other than the object is also separated erroneously as illustrated in FIG. 3E. FIG. 6A illustrates an example of a state in which the object shape determined based on the separation result is viewed from a virtual viewpoint. It is determined that a portion of the object is in an area although there is nothing in the area, as an object 601 in FIG. 6A, and the shape of the stage on which the object is standing appears to be distorted. This occurs because erroneous results of object separation are acquired by a plurality of cameras affected by the flash and the shape is determined using the erroneous results. The shape and size of the object 601 vary depending on the performance, position, and other conditions of the camera that captures images with the flash being lit. For example, even if the shape acquisition is performed on all the frames captured temporally consecutively and the shape is viewed as a temporally-consecutive shape, since the shape acquired while the flash is lit is distorted, the viewer is likely to feel very strange.

Figure 6B:
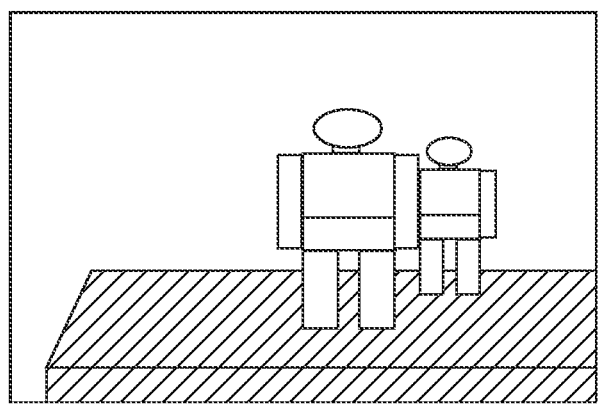
FIG. 6B is a diagram illustrating an example of an image of an object shape determined based on the image illustrated in FIG. 3D, which is viewed from a virtual viewpoint.

In the present exemplary embodiment, the information processing apparatus 100 determines the object shape using the object region separated from the image that is not affected by the flash as in FIG. 3D instead of the image illustrated in FIG. 3E. FIG. 6B illustrates an example of a state in which the determined object shape is viewed from the same viewpoint as in FIG. 6A. It is understood that the object 601, which appears in FIG. 6A but does not exist, disappears.

In the first exemplary embodiment, the process is described in which the object shape is determined with high accuracy even at the timing at which the flash is lit, by acquiring the result of the object separation on the frame affected by the flash based on a result of object separation on another frame of the same camera.

However, as described above in step S506 in FIG. 5, in the case of a moving object, a small error occurs in a result of object separation. In a second exemplary embodiment, a process for reducing an error that is generated due to the movement of an object will be described below.

The hardware configuration of the information processing apparatus 100 according to the present exemplary embodiment is similar to that in the first exemplary embodiment.

The functional configuration of the information processing apparatus 100 according to the present exemplary embodiment includes the captured data group acquisition unit 401, the illumination information acquisition unit 402, the separation method determination unit 403, the separation unit 404, the parameter acquisition unit 405, and the shape determination unit 406, as in the first exemplary embodiment. However, the illumination information acquisition unit 402 is configured to acquire different illumination information from that in the first exemplary embodiment. Further, details of the processing performed by the separation unit 404 are different from those in the first exemplary embodiment.

A process in the present exemplary embodiment will be described focusing on the difference between the present exemplary embodiment and the first exemplary embodiment.

FIG. 7 is a flowchart illustrating an example of a process performed by the information processing apparatus 100 according to the present exemplary embodiment. In step S801, the captured data group acquisition unit 401 acquires, via the input interface 105, a temporally-consecutive multi-viewpoint image data group captured by the plurality of image capturing apparatuses 108. The captured data group acquisition unit 401 outputs the acquired image data to the illumination information acquisition unit 402 and the separation unit 404.

In step S802, the illumination information acquisition unit 402 acquires illumination information. In the present exemplary embodiment, the illumination information acquisition unit 402 acquires illumination information containing information specifying the image capturing apparatuses 108, information about the frame affected by the flash (e.g., frame number), and information about the coordinate value of the pixel affected by the flash, which are associated with one another. The coordinate value of the pixel affected by the flash is, for example, information about u and v that satisfy formulas (1) to (3).

In step S803, the parameter acquisition unit 405 acquires the camera parameters of the respective image capturing apparatuses 108 therefrom via the input interface 105 or from the secondary storage apparatus 104. The parameter acquisition unit 405 outputs the acquired camera parameters to the shape determination unit 406.

In step S804, the separation method determination unit 403 performs control so that all frames captured by the plurality of image capturing apparatuses 108 (all frames acquired in step S801) undergoes the processing of steps S805 to S807. More specifically, the separation method determination unit 403 selects, from all the frames acquired in step S801, one frame to undergo the processing of steps S805 to S807. Hereinafter, the frame that is selected will be referred to as "selected frame". Then, if the processing of steps S805 to S807 on the selected frame is completed, the separation method determination unit 403 selects a frame that has not been selected, as a new selected frame from all the frames acquired in step S801. The separation method determination unit 403 repeats the foregoing processing until the processing of steps S805 to S807 is completed on all the frames acquired in step S801.

In step S805, the separation method determination unit 403 determines a method for separating an object region from the selected frame based on the illumination information acquired in step S802. The separation method determination unit 403 determines whether the illumination information contains information about the correspondence between the number of the image capturing apparatus 108 corresponding to the selected frame and the frame number corresponding to the selected frame.

If the separation method determination unit 403 determines that the illumination information contains information about the correspondence between the number of the image capturing apparatus 108 corresponding to the selected frame and the frame number corresponding to the selected frame (YES in step S805), the separation method determination unit 403 determines the method of step S807 as the object separation method for the selected frame, and the processing proceeds to step S807. On the other hand, if the separation method determination unit 403 determines that the illumination information does not contain information about the correspondence between the number of the image capturing apparatus 108 corresponding to the selected frame and the frame number corresponding to the selected frame (NO in step S805), the separation method determination unit 403 determines the method of step S806 as an object separation method for the selected frame, and the processing proceeds to step S806.

In step S806, the separation unit 404 performs object region separation processing on the selected frame that is not affected by the flash using the background difference method, as in step S505.

In step S807, the separation unit 404 performs object region separation processing on the selected frame that is affected by the flash. FIG. 8 illustrates details of the processing performed in step S807. FIG. 8 is a flowchart illustrating an example of processing performed in step S807.

In step S901, the separation unit 404 acquires the camera parameters that has acquired in step S803.

In step S902, the separation unit 404 calculates the depth of each pixel affected by the flash in the selected frame (pixel at the coordinate value (u, v) in the selected frame that is determined to satisfy formulas (1) to (3)) using the camera parameters acquired in step S901. As used herein, the depth of a pixel refers to the distance between the image capturing apparatus 108 that captures the selected frame and the object in the pixel. The distance between the image capturing apparatus 108 that captures the selected frame and the object in the pixel is, for example, the distance between the position in an image sensor of the image capturing apparatus 108 that corresponds to the pixel and the object.

The separation unit 404 calculates the depth of each pixel affected by the flash in the selected frame based on the camera parameters acquired in step S901 using a method such as a plane sweep method in which a virtual layer is set and the depth of the object is estimated as in stereo matching.

In step S903, the separation unit 404 calculates, using the plane sweep method, or other methods, the depth of each pixel in the frame of one frame before the selected frame that has the same coordinate as the coordinate of a pixel affected by the flash in the selected frame, and the depth of neighborhood pixels neighboring the pixel. The neighborhood pixels neighboring the pixel are pixels located around the pixel and are, for example, pixels contained in a region (e.g., rectangular region of 11-by-11 pixels, rectangular region of 9-by-9 pixels) of a predetermined size with the pixel being the center.

In a case in which the image capturing apparatuses 108 each acquire the distance between the object and the image capturing apparatus 108 that corresponds to a pixel using a range sensor at a time of image capturing, the separation unit 404 may acquire the distances that have been acquired by the image capturing apparatuses 108 as the depth of a pixel in steps S902 and S903.

In step S904, the separation unit 404 performs object separation on the pixels affected by the flash in the selected frame, based on the distances acquired in steps S902 and S903. The separation unit 404 performs the following processing on each pixel affected by the flash.

Specifically, with respect to a pixel having the same coordinate as the coordinate of a pixel affected by the flash and the neighborhood pixels, the separation unit 404 compares the distances each acquired from the frame of one frame before the selected frame in step S903 with the distances acquired for the pixels in the selected frame in step S902. Then, the separation unit 404 identifies the closest distance to the distance acquired for the pixel in the selected frame in step S902, among the distances acquired for the pixel and the neighborhood pixels from the frame one frame before the selected frame in step S903. The separation unit 404 determines the pixel in the frame of one frame before the selected frame that corresponds to the identified distance, as the pixel of the same captured object as that of the pixel affected by the flash in the selected frame.

Then, if the pixel in the frame of one frame before the selected frame that corresponds to the identified distance is an object region, the separation unit 404 determines the pixel affected by the flash in the selected frame as the object region. Further, if the pixel in the frame of one frame before the selected frame that corresponds to the identified distance is not an object but a background region, the separation unit 404 determines the pixel affected by the flash in the selected frame as the background region.

By the foregoing processing, the separation unit 404 can more accurately determine whether an object corresponding to a pixel affected by the flash in the selected frame is separated as an object in the frame one frame before. In this way, the separation unit 404 can accurately determine whether each pixel affected by the flash in the selected frame is an object region.

Further, the separation unit 404 uses the background difference method to separate an object region regarding each pixel in the selected frame that is not affected by the flash, as in step S806.

In step S808, the shape determination unit 406 determines the object shape based on the information about the object regions separated by the separation unit 404 in step S806 or S807 and the camera parameters acquired by the parameter acquisition unit 405 in step S803. In the present exemplary embodiment, the shape determination unit 406 determines the object shape using the visual hull method.

The shape determination unit 406 outputs information about the determined object shape by, for example, displaying the information on the display apparatus 110. Further, the shape determination unit 406 may output the information about the determined object shape by storing the information in the secondary storage apparatus 104. Further, the shape determination unit 406 may output the information about the determined object shape by transmitting the information to a predetermined transmission destination such as an external information processing apparatus As described above, in the present exemplary embodiment, the information processing apparatus 100 performs object separation on the pixels affected by the flash using the depths of the pixels affected by the flash. In this way, the information processing apparatus 100 can separate the object regions more accurately than in the first exemplary embodiment and, thus, can determine the object shape more accurately.

In a third exemplary embodiment, a process will be described below that is suitable for a situation of illumination that changes intricately, such as an illumination in concert or live performance.

The hardware configuration of the information processing apparatus 100 according to the present exemplary embodiment is similar to that in the first exemplary embodiment. Details of the functional configuration of the information processing apparatus 100 according to the present exemplary embodiment will be described below with reference to FIG. 11.

A process in the present exemplary embodiment will be described, focusing on the difference between the present exemplary embodiment and the first exemplary embodiment.

Figure 9:
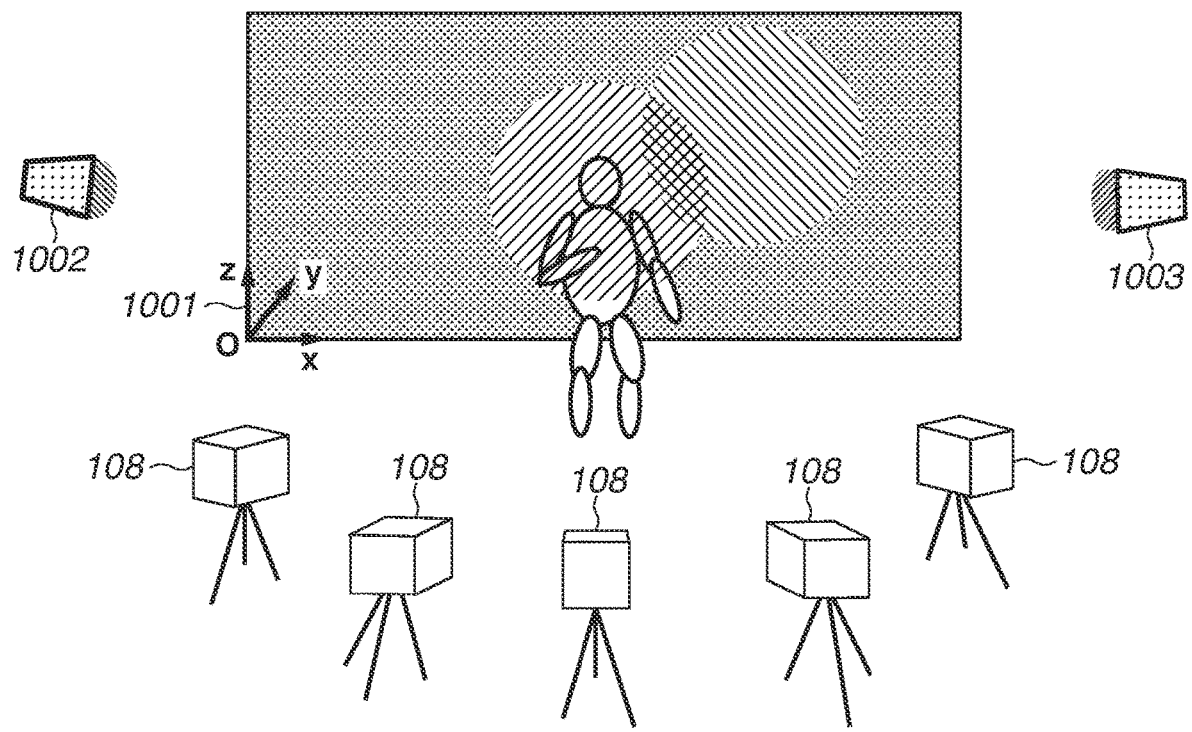
FIG. 9 is a diagram illustrating an example of a layout of the image capturing apparatuses.

FIG. 9 illustrates an example of a layout of the plurality of image capturing apparatuses 108 according to the present exemplary embodiment. A coordinate system 1001 is a coordinate system that is determined in advance for the image-capturing target region. The shape of the stage, the positions and orientations of the image capturing apparatuses 108, the positions and orientations of illumination devices 1002 and 1003 in an image-capturing scene are each specified as a coordinate or vector in the coordinate system 1001. The illumination devices 1002 and 1003 apply light to the stage and have a time code synchronized with the image capturing apparatuses 108. Hereinafter, the light applied by the illumination devices 1002 and 1003 will be referred to as illumination light. Further, the irradiation angle of the illumination light, orientation, color of the illumination light of the illumination devices 1002 and 1003 are controlled based on an instruction from an external apparatus such as the information processing apparatus 100.

Figure 10A:
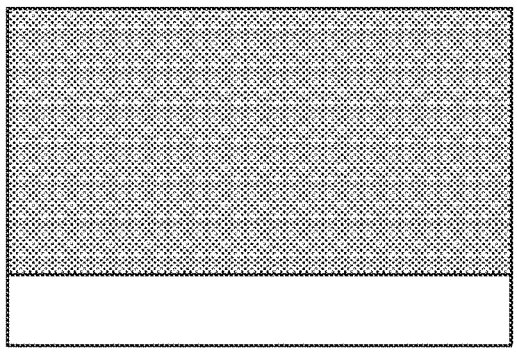
FIG. 10A is a diagram illustrating an example of a background image acquired by capturing an image of an image-capturing target region from the front side.

An image in FIG. 10A is a background image acquired by capturing an image of the image-capturing target region of the plurality of image capturing apparatuses 108 according to the present exemplary embodiment from the front. The background image may be an image captured in a state of no object or no illumination, or may be an image generated by acquiring a mean pixel value or intermediate value of pixels of a plurality of frames captured temporally consecutively.

Figure 10B:
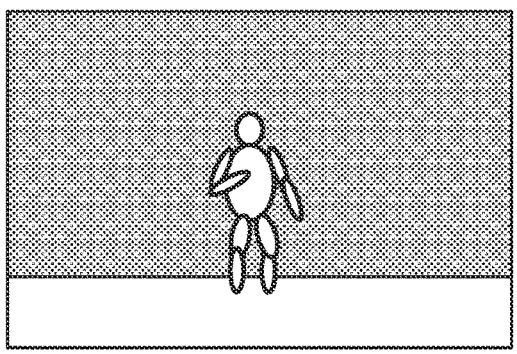
FIG. 10B is a diagram illustrating an example of a captured image of an object standing on a stage.
Figure 10C:
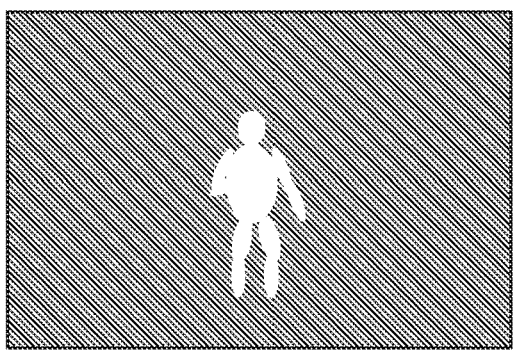
FIG. 10C is a diagram illustrating an example of an image indicating a result of background difference processing on the image illustrated in FIG. 10B using the background image illustrated in FIG. 10A.

An image in FIG. 10B is an image acquired by capturing an image of a state in which an object stands on the stage, and an image in FIG. 10C is an image showing a result of object region separation obtained by applying the background difference method to the image in FIG. 10B using the background image in FIG. 10A. From the image in FIG. 10C, it is understood that only the object is separated.

Figure 10D:
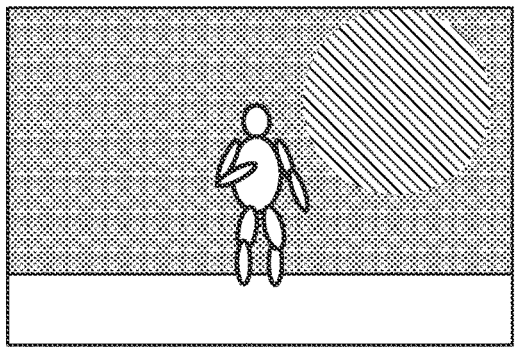
FIG. 10D is a diagram illustrating an example of an image captured in a state in which the object stands on the stage and light is applied to the object and the stage.
Figure 10E:
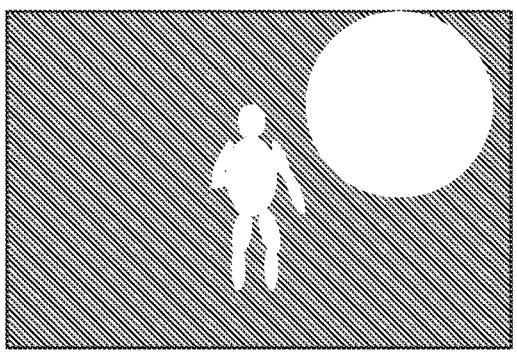
FIG. 10E is a diagram illustrating an example of an image indicating a result of background difference processing performed on the image illustrated in FIG. 10D using the background image illustrated in FIG. 10A.
Figure 10F:
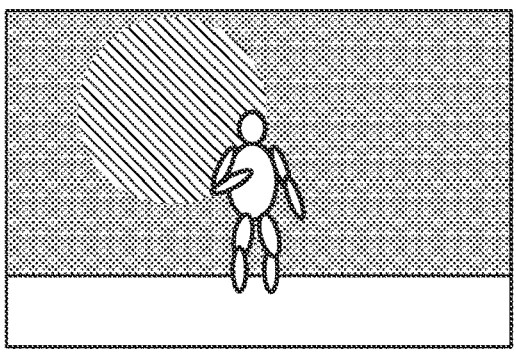
FIG. 10F is a diagram illustrating another example of an image captured in a state in which the object stands on the stage and light is applied to the object and the stage.

FIG. 10D is a captured image of a state in which the object and the stage are irradiated with the illumination light from the illumination device 1002 or 1003, and FIG. 10E is an image illustrating a result of object region separation processing on the image in FIG. 10D. FIG. 10F is a captured image of a state in which the object and the stage are illuminated by the illumination light from the illumination device 1002 or 1003, and FIG. 10G is an image illustrating a result of object region separation processing on the image in FIG. 10F.

Figure 10G:
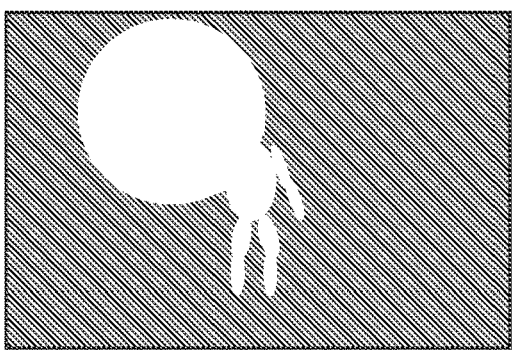
FIG. 10G is a diagram illustrating another example of an image indicating a result of the background difference processing on the image illustrated in FIG. 10F using the background image illustrated in FIG. 10A.

From the images in FIGS. 10E and 10G, it is understood that not only the object but also the region (illuminated region) on the stage irradiated with the illumination light by the illumination device 1002 or 1003 are separated as an object. Especially in the example in FIG. 10G, the object overlaps the illuminated region on the stage illuminated with the illumination light by the illumination device 1002 or 1003 and, thus, the boundary between the object and the illuminated region on the stage is unclear. If the object shape is determined using such an object separation result, an object shape that does not exist appears besides the object, as in FIG. 6A. The process in the present exemplary embodiment is a process suitable for such a situation.

The process according to the present exemplary embodiment will be described with reference to FIGS. 11 and 12.

Figure 11:
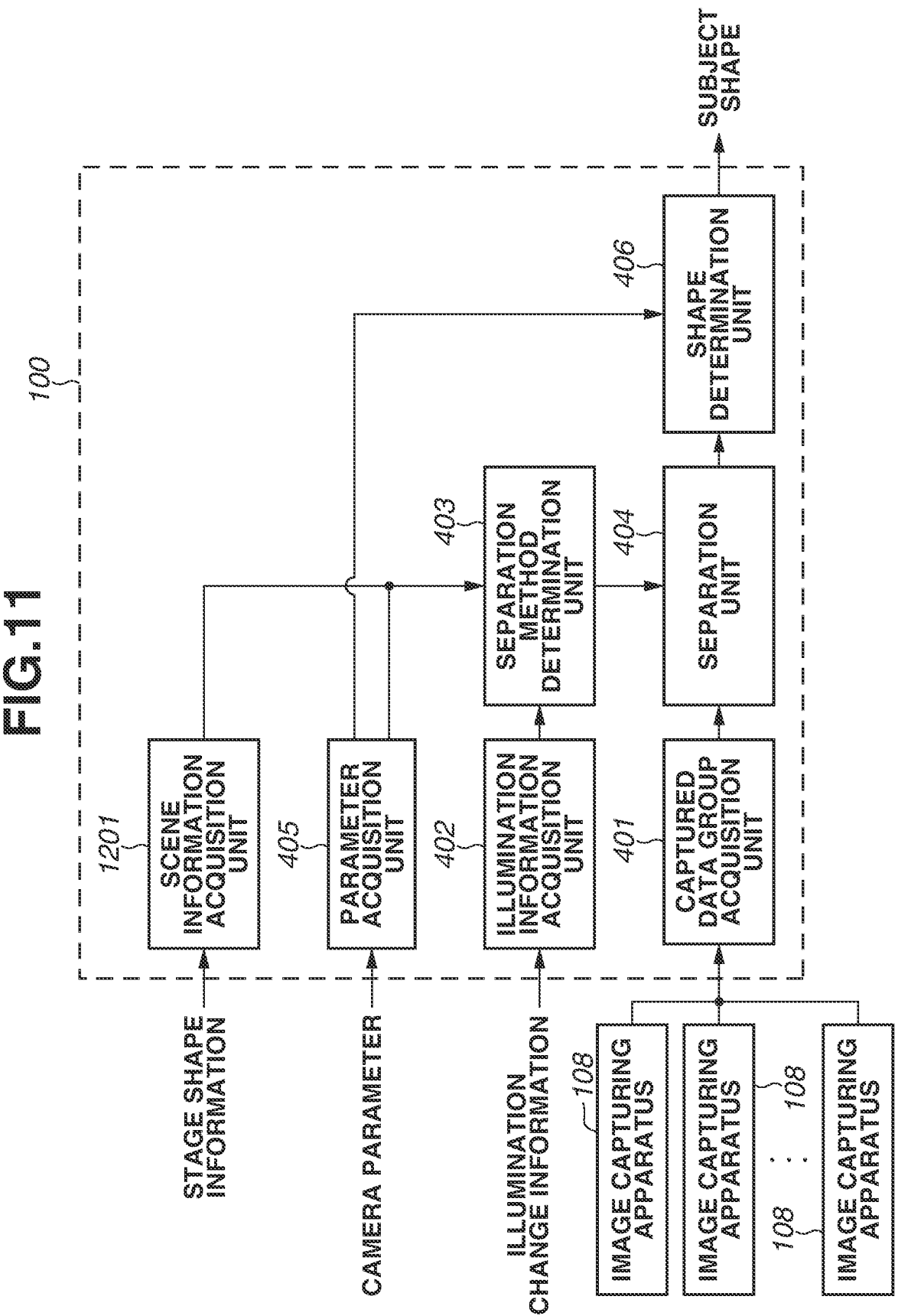
FIG. 11 is a block diagram illustrating an example of a functional configuration of the information processing apparatus.
Figure 12:
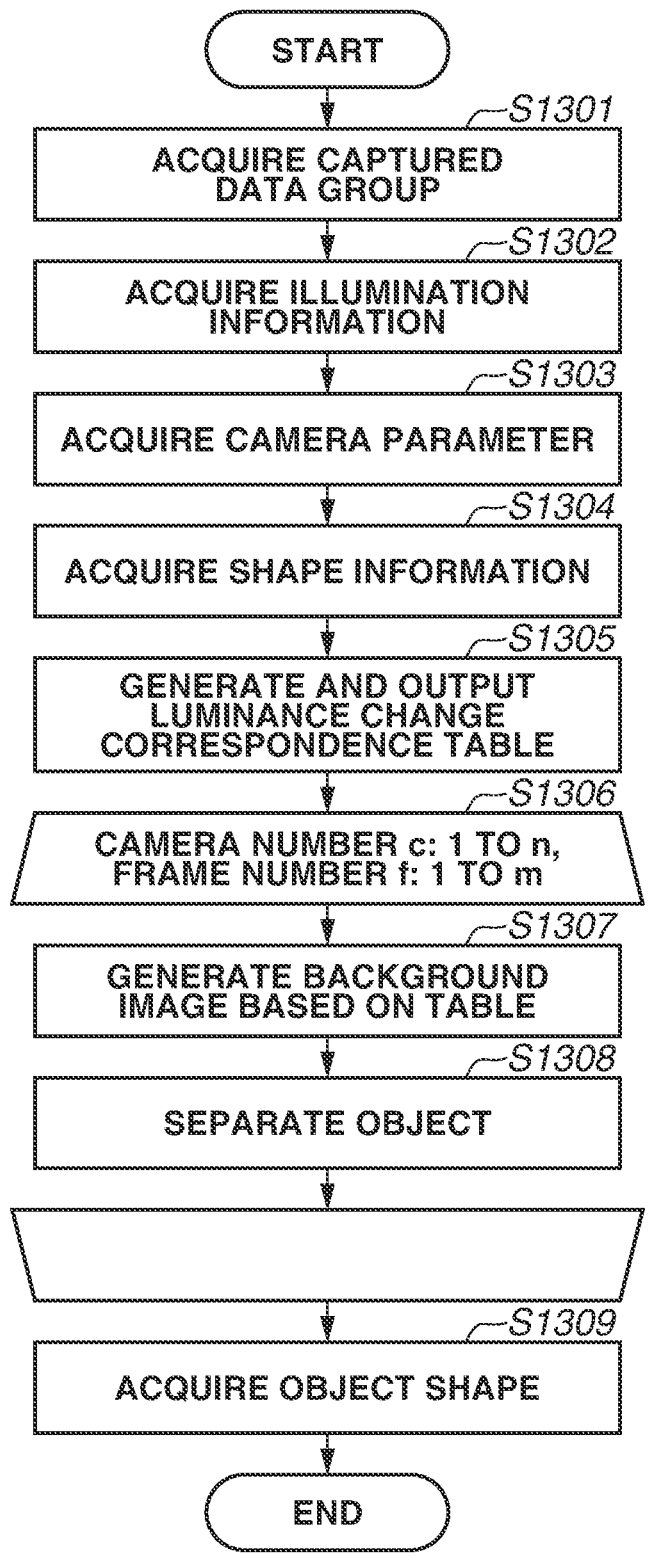
FIG. 12 is a flowchart illustrating an example of a process performed by the information processing apparatus.

FIG. 11 is a block diagram illustrating an example of a functional configuration of the information processing apparatus 100 according to the present exemplary embodiment. The information processing apparatus 100 according to the present exemplary embodiment includes the captured data group acquisition unit 401, the illumination information acquisition unit 402, the separation method determination unit 403, the separation unit 404, the parameter acquisition unit 405, and the shape determination unit 406, as in FIG. 4. Further, the information processing apparatus 100 includes a scene information acquisition unit 1201, which is different from FIG. 4.

The scene information acquisition unit 1201 acquires stage shape information indicating the shape of the stage from the image capturing apparatuses 108 via the input interface 105 or from the secondary storage apparatus 104. In the present exemplary embodiment, the image capturing apparatuses 108 can identify the stage shape by measuring the stage using the range sensor.

Further, the illumination information acquisition unit 402 in the present exemplary embodiment acquires the illumination information not based on the image data input from the captured data group acquisition unit 401 but from the illumination devices 1002 and 1003 via the input interface 105 or from the secondary storage apparatus 104.

Further, the separation method determination unit 403 according to the present exemplary embodiment receives the camera parameters input from the parameter acquisition unit 405.

In step S1301, the captured data group acquisition unit 401 acquires images captured by the image capturing apparatuses 108 and outputs the acquired images to the separation unit 404.

In step S1302, the illumination information acquisition unit 402 acquires illumination information from the illumination devices 1002 and 1003 via the input interface 105 or from the secondary storage apparatus 104. In the present exemplary embodiment, the illumination information contains information about the positions and orientations of the illumination devices 1002 and 1003 at the time code synchronized with the image capturing apparatuses 108, the irradiation angle of the illumination light, and the color of the illumination light, which are associated with one another. The illumination information acquisition unit 402 outputs the acquired illumination information to the separation method determination unit 403.

In step S1303, the parameter acquisition unit 405 acquires camera parameters of the image capturing apparatuses 108 and outputs the acquired camera parameters to the separation method determination unit 403 and the shape determination unit 406.

In step S1304, the scene information acquisition unit 1201 acquires shape information indicating the shape of the stage in the image-capturing target region from the image capturing apparatuses 108 via the input interface 105 or from the secondary storage apparatus 104. The scene information acquisition unit 1201 outputs the acquired shape information to the separation method determination unit 403.

In step S1305, the separation method determination unit 403 generates a table described below based on the illumination information acquired in step S1302, the camera parameters acquired in step S1303, and the shape information acquired in step S1304. Specifically, the separation method determination unit 403 generates a table that specifies how pixels in each frame (time code) captured by the image capturing apparatuses 108 is affected by the illumination light. An example of the table will be described below with reference to FIG. 13.

The separation method determination unit 403 can find out the states (position and orientation, irradiation angle, color information) of the illumination devices 1002 and 1003 at each predetermined time point based on the illumination information. The separation method determination unit 403 can determine a region on the stage that is illuminated by the illumination light from the illumination devices 1002 and 1003 using, for example, formulas (4) to (6) below, based on the states of the illumination devices 1002 and 1003 and the shape information.

Formula (4) is a formula that expresses a vector of the illumination light applied by the illumination devices 1002 and 1003, in the light ray direction. Formula (5) is a formula that expresses the stage shape. In the present exemplary embodiment, the stage has a flat surface. Formula (6) is a formula for obtaining an intersection point $x_s$ (three-dimensional coordinate) of the vector of the light ray direction and the flat surface that are obtained from formulas (4) and (5). In formulas (4) to (6), x is a vector indicating the direction of the illumination light, $x_0$ is a position coordinate of the illumination, s is a predetermined coefficient indicating the size of the vector x, p is a vector indicating the orientation of the illumination device (direction of the illumination light applied by the illumination device), n is a normal vector of the flat surface of the stage, and q is a position coordinate of a single point on the flat surface of the stage.

The separation method determination unit 403 can calculate, using formulas (4) to (6), the position on the stage at which the center of the illumination light from the illumination device 1002, 1003 intersects. Further, the separation method determination unit 403 can identify the position at which an end portion of the illumination light from the illumination devices 1002 and 1003 intersects with the stage, by substituting not the vector p but a vector p', which is obtained by adding a rotation corresponding to the irradiation angle of the illumination devices 1002 and 1003 to the vector p, into formula (6). Further, the separation method determination unit 403 can identify the position at which light contained in the illumination light from the illumination devices 1002 and 1003 intersects with the stage, by substituting a vector obtained by adding a rotation corresponding to an angle smaller than the irradiation angle of the illumination light of the illumination devices 1002 and 1003 for the vector p into formula (6).

$$x = x_0 + sp \qquad (4)$$

$$n \cdot (x - q) = 0 \qquad (5)$$

$$x_s = x_0 - \frac{n \cdot (x - q)}{n \cdot p} p \qquad (6)$$

Further, the separation method determination unit 403 can calculate the illuminated region of each camera of the image capturing apparatuses 108 on the image using, for example, formula (7) based on the illuminated region on the stage and the camera parameters. In formula (7), "A" is an internal matrix obtained from the internal parameter of the camera, u is a position corresponding to the point $x_s$ in the image captured by the image capturing apparatuses 108, R is an external matrix obtained from the external parameter, and t is a camera position.

$$u = A_c^{-1} R_c^{-1} (x_s - t) \qquad (7)$$

The separation method determination unit 403 can determine the region illuminated by the illumination light on the image captured by the image capturing apparatuses 108 at a predetermined time point using formulas (4) to (7). The separation method determination unit 403 generates a table as illustrated in FIG. 13 based on the determined region. The table specifies which illumination is applied to each pixel of an image captured by the image capturing apparatuses 108 at each predetermined time point based on the illumination information. The separation method determination unit 403 stores the generated table in, for example, the secondary storage apparatus 104.

How each pixel of an image captured by the image capturing apparatuses 108 is affected by the illumination light in a state in which there is no object on the stage at a predetermined time point can be determined by referring to the table stored in the secondary storage apparatus 104. In the example in FIG. 13, it is understood that, for example, the pixel of the coordinate value (1, 1) of the image captured by the image capturing apparatus 108 of the camera number 1 at a time point corresponding to the frame number 1 is affected by the illumination device 1003 (blue illumination light). Further, it is understood that the pixel of the coordinate value (1, 1) of an image captured by the image capturing apparatus 108 of the camera number 2 at a time point corresponding to the frame number 1 is affected by both the illumination device 1002 (yellow illumination light) and the illumination device 1003 (red illumination light). The separation method determination unit 403 outputs the generated table as illustrated in FIG. 13 to the separation unit 404.

In step S1306, the separation method determination unit 403 performs control so that all frames captured by the plurality of image capturing apparatuses 108 (all frames acquired in step S1301) undergoes the processing of steps S1307 and S1308. More specifically, the separation method determination unit 403 selects, from all the frames acquired in step S1301, one frame to undergo the processing of steps S1307 and S1308. Hereinafter, the frame that is selected will be referred to as "selected frame".

Then, if the processing of steps S1307 and S1308 on the selected frame is completed, the separation method determination unit 403 selects a frame that has not been selected, as a new selected frame from all the frames acquired in step S1301. The separation method determination unit 403 repeats the foregoing processing until the processing of steps S1307 and S1308 on all the frames acquired in step S1301 is completed.

In step S1307, the separation unit 404 generates, based on the table generated in step S1305, a background image for use in the background difference method with respect to an image captured by the image capturing apparatuses 108 at a predetermined time point. The separation unit 404 refers to the table generated in step S1305 and acquires the camera number of the camera that generates the background image, the frame number f, and the illumination state (applied illumination and applied color) of the coordinate value (u, v). Then, the separation unit 404 searches the table for a frame number corresponding to the same illumination state as the acquired illumination state with the same camera number c and the same coordinate value (u, v).

The separation unit 404 searches for all frames of the same illumination state, calculates, for example, an average pixel value or intermediate value of the coordinates (u, v) of the plurality of searched frames, determines the pixel value at the coordinate (u, v) of the background image. The separation unit 404 performs the foregoing processing on all pixels of the image to thereby generate the background image.

In step S1308, the separation unit 404 performs background difference processing on the image captured by the image capturing apparatus 108 corresponding to the background image at the time point corresponding to the background image, using the background image generated in step S1307, and separates the object. The separation unit 404 outputs the object separation result to the shape determination unit 406.

In step S1309, the shape determination unit 406 determines the object shape based on the information about the object region separated by the separation unit 404 in step S1308 and the camera parameters acquired in step S1303 by the parameter acquisition unit 405. In the present exemplary embodiment, the shape determination unit 406 uses the visual hull method to determine the object shape.

As described above, in the present exemplary embodiment, the information processing apparatus 100 identifies a position illuminated by the illumination light based on the illumination information, the shape information, and the camera parameters, and generates the table that specifies how each pixel of an image captured at each time point by the image capturing apparatuses 108 is affected by the illumination light. Then, the information processing apparatus 100 generates, based on the generated table, a background image corresponding to the illumination state in each image capturing apparatus 108 and each frame, and uses the background image in the background difference method in the object separation. In this way, the information processing apparatus 100 can accurately determine the object shape even in a case in which light that changes intricately, such as an illumination in concert or live performance, is applied to the image-capturing target region.

Other Exemplary Embodiment

An exemplary embodiment of the present invention is also realizable by a process in which a program for implementing one or more functions of the above-described exemplary embodiments is supplied to a system or apparatus via a network or storage medium and one or more processors of a computer of the system or apparatus read and execute the program. Further, an exemplary embodiment of the present invention is also implemented by a circuit (e.g., application-specific integrated circuit (ASIC)) for implementing one or more functions.

For example, part of afunctional configuration of the information processing apparatus 100 or an entire functional configuration may be implemented as hardware in the information processing apparatus 100.

While the exemplary embodiments of the present invention have been described in detail above, it should be apparent that the present invention is not to be limited by any specific exemplary embodiment. The above-described exemplary embodiments can be combined in any manner.

According to an exemplary embodiment of the present invention, an object shape can be determined with high accuracy even in a case in which light applied to an image-capturing target region is changed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-071723, filed Apr. 3, 2018, which is hereby incorporated by reference herein in its entirety.

What is claimed is:

1. An information processing apparatus, comprising:
one or more memories storing instructions; and
one or more processors executing the instructions to:
obtain a movie captured by an image capturing device included in a plurality of image capturing devices configured to capture a moving object from a plurality of viewpoints, the movie including a plurality of images;
specify, in a case where a first image included in the obtained movie is captured by the image capturing device when specific light is not applied to an image-capturing target region of the image capturing device, the specific light being light applied for a period not longer than a threshold value, a first region of the moving object in the first image based on a difference between the first image and an image not including the moving object, the specified first region of the moving object being used for a determination of a first shape of the moving object at a time point corresponding to the first image; and
specify, in a case where a second image included in the obtained movie is captured by the image capturing device when the specific light is applied to the image-capturing target region of the image capturing device, a second region of the moving object in the second image based on the specified first region of the moving object in the first image captured by the image capturing device when the specific light is not applied to the image-capturing target region of the image capturing device, the specified second region of the moving object being used for a determination of a second shape of the moving object at a time point corresponding to the second image, the second shape of the moving object being different from the first shape of the moving object.

2. The information processing apparatus according to claim 1, wherein the specified second region of the moving object in the second image is the specified first region of the moving object in the first image.

3. The information processing apparatus according to claim 1, wherein the second region of the moving object in the second image is specified based on the specified first region of the moving object in the first image and a distance between the image capturing device and a region to which the specific light is applied.

4. The information processing apparatus according to claim 1, wherein the second image is determined based on illumination information about the light applied to the image-capturing target region of the image capturing device.

5. The information processing apparatus according to claim 4, wherein the illumination information contains information about a time point at which the specific light is applied and information for specifying the image capturing device that captures a region illuminated by the specific light.

6. The information processing apparatus according to claim 4, wherein the illumination information contains information for specifying a region affected by the specific light applied to the image-capturing target region of the image capturing device, the region being included in the image captured by the image capturing device.

7. The information processing apparatus according to claim 4, wherein the illumination information contains information about a timing at which an illumination device emits the specific light, information about a position of the illumination device, information about a direction in which the illumination device emits the specific light, and information for specifying a color of the specific light to be emitted by the illumination device.

8. An information processing method comprising:
obtaining a movie captured by an image capturing device included in a plurality of image capturing devices configured to capture a moving object from a plurality of viewpoints, the movie including a plurality of images;
specify, in a case where a first image included in the obtained movie is captured by the image capturing device when specific light is not applied to an image-capturing target region of the image capturing device, the specific light being light applied for a period not longer than a threshold value, a first region of the moving object in the first image based on a difference between the first image and an image not including the moving object, the specified first region of the moving object being used for a determination of a first shape of the moving object at a time point corresponding to the first image; and
specifying, in a case where a second image included in the obtained movie is captured by the image capturing device when the specific light is applied to the image-capturing target region of the image capturing device, a second region of the moving object in the second image based on the specified first region of the moving object in the first image captured by the image capturing device when the specific light is not applied to the image-capturing target region of the image capturing device, the specified second region of the moving object being used for a determination of a second shape of the moving object at a time point corresponding to the second image, the second shape of the moving object being different from the first shape of the moving object.

9. The information processing method according to claim 8, wherein the specified second region of the moving object in the second image is the specified first region of the moving object in the first image.

10. A non-transitory computer-readable storage medium storing a program for causing a computer to execute an information processing method comprising:
obtaining a movie captured by an image capturing device included in a plurality of image capturing devices configured to capture a moving object from a plurality of viewpoints, the movie including a plurality of images;
specifying, in a case where a first image included in the obtained movie is captured by the image capturing device when specific light is not applied to an image-capturing target region of the image capturing device, the specific light being light applied for a period not longer than a threshold value, a first region of the moving object in the first image based on a difference between the first image not including the moving object, the specified first region of the moving object being used for a determination of a first shape of the moving object at a time point corresponding to the first image; and specifying, in a case where a second image included in the obtained movie is captured by the image capturing device when the specific light is applied to the image-capturing target region of the image capturing device, a second region of the moving object in the second image based on the specified first region of the moving object in the first image captured by the image capturing device when the specific light is not applied to the image-capturing target region of the image capturing device, the specified second region of the moving object being used for a determination of a second shape of the moving object at a time point corresponding to the second image, the second shape of the moving object being different from the first shape of the moving object.

11. The information processing method according to claim 8, wherein the second region of the moving object in the second image is specified based on the specified first region of the moving object in the first image and a distance between the image capturing device and a region to which the specific light is applied.

12. The information processing apparatus according to claim 1, wherein the one or more processors further execute the instructions to:
  determine, based on the specified first region of the moving object, the first shape of the moving object at the time point corresponding to the first image; and
  determine, based on the specified second region of the moving object, the second shape of the moving object at the time point corresponding to the second image, the second shape of the moving object being different from the first shape of the moving object.

* * * * *